US005698368A

United States Patent [19]

Obata et al.

[11] Patent Number: 5,698,368

[45] Date of Patent: Dec. 16, 1997

[54] THERMAL TRANSFER SHEET WITH TABULAR METAL POWDER

[75] Inventors: Hitoshi Obata; Nobuyuki Tominaga, both of Tokyo-to, Japan

[73] Assignee: Dai Nippon Printing Co., Ltd., Japan

[21] Appl. No.: 624,317

[22] Filed: Mar. 28, 1996

[30] Foreign Application Priority Data

| | | | |
|---|---|---|---|
| Mar. 29, 1995 | [JP] | Japan | 7-96224 |
| Mar. 30, 1995 | [JP] | Japan | 7-97946 |

[51] Int. Cl.[6] .............. G03C 1/76; G03C 8/10; B32B 5/16; B32B 9/00

[52] U.S. Cl. .............. 430/273.1; 430/200; 430/270.1; 430/964; 428/328; 503/227

[58] Field of Search .............. 430/200, 964, 430/270.1, 273.1; 428/328; 503/227

[56] References Cited

U.S. PATENT DOCUMENTS

| | | | |
|---|---|---|---|
| 5,273,857 | 12/1993 | Neumann et al. | 430/200 |
| 5,312,683 | 5/1994 | Chou et al. | 428/328 |
| 5,464,723 | 11/1995 | Chou | 430/200 |
| 5,538,831 | 7/1996 | Oshima et al. | 430/200 |

*Primary Examiner*—Richard L. Schilling
*Attorney, Agent, or Firm*—Parkhurst Wendel & Burr, L.L.P.

[57] ABSTRACT

A thermal transfer sheet is provided which can eliminate the need to use any apparatus, such as equipment for vapor deposition, and to provide any anchor layer for vapor deposition and can provide a good print having high brightness even on paper having low smoothness. The thermal transfer sheet comprises: a substrate sheet; and a hot-melt ink layer provided on at least one surface of the substrate sheet, the hot-melt layer containing a metallic powder having such a particle geometry that the shape is tabular, the diameter is from 8 to 20 μm and the thickness is from 0.01 to 5 μm.

1 Claim, No Drawings

THERMAL TRANSFER SHEET WITH TABULAR METAL POWDER

TECHNICAL FIELD

The present invention relates to a thermal transfer sheet for a thermal transfer printer utilizing heating means such as a thermal head or a laser beam. More particularly, the present invention relates to a thermal transfer sheet which enables a print having metallic luster to be simply provided by means of a thermal transfer printer.

A melt transfer system is known as one type of thermal transfer system. In the melt transfer system, a thermal transfer sheet, wherein a hot-melt ink layer formed of a dispersion of a colorant, such as a pigment, and a binder, such as a hot-melt wax or resin, is supported on a substrate sheet such as a plastic film, is provided, and energy corresponding to image information is applied to a heating device, such as a thermal head, to transfer the colorant together with the binder onto an image-receiving sheet, such as paper or a plastic sheet (Japanese Patent Laid-Open No. 105395/1982). Images formed by the melt transfer system have high density and excellent sharpness, and the melt transfer system is suitable for recording of digital images of letters, lines and the like. Further, thermal transfer sheets respectively for yellow, magenta, cyan, black and the like can be used to conduct overprinting on an image-receiving paper, thereby forming a multi- or full-color image.

Furthermore, there is a demand for the formation of a print having metallic luster in a simple manner by the melt transfer system, and, for meeting this demand, a thermal recording medium comprising a substrate sheet and, provided on one surface thereof in the following order, a release layer, an anchor layer for vapor deposition, a vapor-deposited metallic layer, and an adhesive layer has been proposed, for example, in Japanese Patent Laid-Open No. 30288/1988. Apart from the above recording medium, a thermal transfer material has been proposed wherein an ink layer formed of a dispersion of a pigment of a metallic powder, such as aluminum or bronze, in a hot-melt vehicle is provided on a support (Japanese Patent Laid-Open No. 290789/1988).

In the case of the construction using a vapor-deposited metal layer, a print having high brightness and excellent visibility can be provided. However, equipment, such as a vapor deposition apparatus, is necessary to form the vapor-deposited metal layer, resulting in lowered production efficiency. Further, the transferability of the ink onto plain paper is poor, and, since the vapor-deposited metal layer per se has no adhesion, an anchor layer for vapor deposition should be provided as in the prior art, unfavorably rendering the production process as a whole complicated.

On the other hand, in the case of reproduction of metallic luster by the conventional method, i.e., by providing an ink layer formed of a dispersion of a metallic pigment in a hot-melt vehicle, particularly when a gold color is reproduced, it is necessary to incorporate a red dye, and/or a yellow dye or alternatively a red pigment, and/or a yellow pigment in a thermoplastic resin with aluminum dispersed therein, or to form a multi-layer structure, i.e., to provide a colorant layer containing a red dye, and/or a yellow dye or alternatively a red pigment, and/or a yellow pigment on an ink layer formed of a dispersion of aluminum in a thermoplastic resin. Further, an ink layer formed of a dispersion of bronze in a thermoplastic resin is generally used. The former method offers only poor metallic luster, while the latter method poses a problem of safety attributable to bronze.

DISCLOSURE OF INVENTION

An object of the present invention is to solve the above problems and to provide a thermal transfer sheet which can eliminate the need to use any apparatus, such as equipment for vapor deposition, and to provide an anchor layer for vapor deposition, and can provide a color print which has high brightness and good metallic luster even on paper having low smoothness.

In order to attain the above object, the thermal transfer sheet of the present invention is characterized by comprising a hot-melt ink layer containing a metallic powder having such a particle geometry that the shape is tabular, the diameter is 8 to 20 μm and the thickness is 0.01 to 5 μm.

According to the present invention, when the ink layer is transferred onto an image-receiving paper, the metallic powder having such a particle geometry that the shape is tabular, the diameter is 8 to 20 μm and the thickness is 0.01 to 5 μm becomes such a state that the tabular particles in the transferred ink layer are arranged parallel to the image-receiving paper. Therefore, irregular reflection of light is less likely to occur on the resultant print, offering excellent metallic luster.

When the particles in a planar state of the tabular metallic powder have a diameter of 8 to 20 μm and a thickness of 0.01 to 5 μm, the metallic powder has satisfactory covering power against an image-receiving paper, the image becomes less likely to be influenced by irregularities on the surface of the image-receiving paper, making it possible to provide a color print having good metallic luster even on a paper having low smoothness.

Further, according to the thermal transfer sheet of the present invention, overprinting is possible. Therefore, lustrous prints of various colors can be prepared by printing using thermal transfer sheets for four colors of Y, M, C, and Bk by means of a printer for the preparation of a process color.

For example, in a thermal transfer sheet, according to the present invention, with a metallic powder dispersed therein, a silver print can be provided by incorporating no pigment. Further, printing of yellow, magenta, or cyan thereon or overprinting of these colors can provide red, blue, and green prints. Furthermore, a photograph-like color may be created with the aid of a half-tone screen or the like, thus enabling prints having various types of luster to be provided.

Substrate sheets commonly used in the conventional thermal transfer sheets as such may be used as the substrate sheet in the present invention. Specific substrate sheets usable herein include films of plastics such as polyesters, polypropylene, cellophane, polycarbonate, cellulose acetate, polyethylene, polyvinyl chloride, polystyrene, nylon, polyimide, polyvinylidene chloride, polyvinyl alcohol, fluororesins, chlorinated rubber, and ionomers; papers such as capacitor paper and paraffin paper; nonwoven fabrics; and materials prepared by combining the above materials. The thickness of the substrate sheet may vary depending upon the material and may be determined so that the strength and thermal conductivity of the substrate are suitable. However, it is preferably 2 to 25 μm. A heat-resistant slip layer may also be provided on the surface of the substrate sheet remote from the transfer layer, in order to prevent fusing of the substrate sheet to a thermal head and, at the same time, to improve the slipperiness.

The hot-melt ink layer provided on the substrate sheet is characterized by containing a tabular metallic powder wherein the circle in a planar state has a diameter of 8 to 20

μm. Further, wax, resins and the like used in the conventional hot-melt ink layer may be used as a binder in the formation of the hot-melt ink layer.

Furthermore, a metallic powder pigment, such as aluminum, a yellow pigment, a red pigment, or mixed pigments prepared by mixing red, yellow and the like together may be incorporated in order to provide good metallic luster.

The metallic powder used in the present invention is a tabular powder having such a particle geometry that the circle on a plane has a diameter of 8 to 20 μm, preferably 10 to 15 μm, and a thickness of 0.01 to 5 μm. It is distinguished from powders, used in the prior art, wherein the particles are in a spherical form or a form similar thereto.

When the particles constituting the metallic powder are tabular, the tabular particles in the transferred ink layer are arranged parallel to the image-receiving paper. Therefore, irregular reflection of light is less likely to occur on the resultant print, offering excellent metallic luster. On the other hand, when the particles constituting the metallic powder are spherical, the surface of the transferred ink layer has irregularities due to the spherical powder particles. In this case, irregular reflection of light is likely to occur, and the covering power is also poor.

When the circle on a plane of the metallic powder has a diameter of less than 8 μm, no satisfactory covering power against the image-receiving paper can be provided, resulting in deteriorated metallic luster. On the other hand, when it exceeds 20 μm, the dispersibility of the metallic powder in the hot-melt ink becomes so poor that a problem occurs such as sedimentation of the metallic powder during coating. Further, the transferability of the ink is also deteriorated.

When the thickness of the tablets constituting the metallic powder is less than 0.01 μm, it is difficult to retain the shape of the metallic powder, while when it exceeds 5 μm, the metallic powder particles do not take the tabular form.

Waxes usable as the binder include various waxes such as microcrystalline wax, carnauba wax, paraffin wax, Fischer-Tropsh wax, various types of low-molecular weight polyethylene, Japan wax, beeswax, spermaceti, insect wax, wool wax, shellac wax, candelilla wax, petrolatum, partially modified waxes, fatty esters, and fatty amides.

Resins usable herein include thermoplastic elastomers, such as polyester resin, polyamide resin, polyolefin resin, acrylate resin, styrene resin, ethylene/vinyl acetate copolymer, and styrene/butadiene rubber.

Preferably, the composition for a hot-melt ink layer comprises 10 to 50% by weight of the tabular metallic powder, 20 to 50% by weight of the resin, and 30 to 70% by weight of the wax.

When the proportion of the tabular metallic powder is smaller than the above range, no desired metallic luster can be reproduced and, at the same time, the resolution of the print is lowered. On the other hand, when the proportion exceeds the above range, the strength of the transferred ink layer is unfavorably lowered.

When the proportion of the resin is smaller than the above range, the strength of the transferred ink layer is unfavorably lowered. On the other hand, when it exceeds the above range, the metallic tone and luster and the resolution of the print are unfavorably deteriorated.

When the proportion of the wax is smaller than the above range, the flowability becomes so low that no good transferability of the ink layer can be attained. On the other hand, when it exceeds the above range, no desired metallic luster can be reproduced.

For the formation of the hot-melt ink layer, the composition for a hot-melt ink layer may be coated by hot-melt coating, hot lacquer coating, gravure direct coating, gravure reverse coating, knife coating, air coating, or roll coating to form a hot-melt ink layer having a thickness of 1 to 8 μm, preferably 2 to 6 μm. When the thickness is less than 1 μm, the metallic tone and metallic luster are not good, when it exceeds 8 μm, the sensitivity in transfer at the time of printing is unfavorably lowered.

In addition, a release layer may be optionally provided between the substrate sheet and the hot-melt ink layer.

The release layer is composed mainly of wax, and, in order to improve the adhesion to the substrate sheet, it is possible to add a minor amount of the above-described thermoplastic elastomer, polyolefin resin, polyester resin or the like.

For the formation of the release layer, the composition for a release layer may be coated by hot-melt coating, hot lacquer coating, gravure direct coating, gravure reverse coating, knife coating, air coating, or roll coating to form a release layer having a thickness of 0.05 to 5 μm. When the thickness is less than 0.05 μm, the adhesion between the substrate sheet and the thermally transferable ink layer is so high that no good releasing effect can be attained. On the other hand, when it exceeds 5 μm, the sensitivity in transfer at the time of printing is unfavorably lowered.

Further, a surface layer may be optionally provided on the hot-melt ink layer in order to improve the storage stability and the transferability of the ink and, in addition, to prevent color-to-color mixing at the time of overprinting.

The formation of the surface layer using a wax emulsion can offer an advantage that, in the formation of the surface layer, the wax emulsion does not attack the surface of the hot-melt ink layer provided before the formation of the surface layer.

Further, since the wax is maintained in a particulate form in the surface layer, the printing area can be more clearly distinguished from the nonprinting area at the time of the transfer as compared with the case where the surface layer is in a film form free from any particles.

Wax particles usable herein include those having a melting point of 60° to 90° C., among various waxes such as polyethylene wax, paraffin wax, carnauba wax, microcrystalline wax, Japan wax, beeswax, spermaceti, insect wax, wool wax, candelilla wax, partially modified wax, and fatty amides.

Wax particles having a melting point below 60° C. are causative of blocking, while the use of wax particles having a melting point above 90° C. results in unsatisfactory sensitivity in printing. The selection of such a material that the melting point of the surface layer becomes higher than that of the hot-melt ink layer is preferred.

The average particle diameter of the wax particles is preferably 0.1 to 5 μm. When the average particle diameter is less than 0.1 μm, the surface layer cannot prevent color-to-color intermixing, while it exceeds 5 μm, the sensitivity in printing is unfavorably lowered.

Further, the incorporation of silica, microsilica, talc, urea resin, melamine resin, calcium carbonate or the like in an amount of 5 to 45% based on the total weight of the surface layer can offer an anti-blocking effect.

When the above materials are used to form a surface layer, the resultant surface layer is highly sensitive to heat and, at the time of transfer, is rapidly solidified upon contact with an image-receiving sheet. Therefore, the transferred ink is satisfactorily fixed onto the image without penetration into the paper. Further, in the case of overprinting, the surface of a newly transferred ink layer is rapidly solidified upon contact with the previously transferred ink layer, that is, the newly transferred ink does not cause color-to-color intermixing with the previously transferred ink layer.

The surface layer is formed by coating a coating liquid in the form of an emulsion of wax particles, as described above, dispersed in water onto a previously provided hot-melt ink layer at a coverage of 0.3 to 2 g/m$^2$ and drying the coating.

When the coverage of the surface layer is less than 0.3 g/m$^2$, the surface layer cannot prevent color-to-color intermixing, while when it exceeds 2 g/m$^2$, the sensitivity in printing is unfavorably lowered.

The present invention will now be described in more detail with reference to the following examples and comparative examples. In the following examples and comparative examples, "parts" or "%" is by weight unless otherwise specified.

EXAMPLE A1

The following composition for a hot-melt ink layer was coated by means of a bar coater at a coverage of 5 g/m$^2$ on a solid basis on a 4.5 μm-thick polyester film (Lumirror, manufactured by Toray Industries, Inc.) with a heat-resistant slip layer formed on the back surface thereof, and the resultant coating was dried at 80° C. to form a hot-melt ink layer, thereby preparing a thermal transfer sheet of the present invention.

Composition For Hot-Melt Ink Layer

| | |
|---|---|
| Pigment | 10 parts |
| Aluminum paste (diameter: 13 μm, thickness: 0.07 μm) | 25 parts |
| EVA | 10 parts |
| Carnauba wax | 7 parts |
| Candelilla wax | 14 parts |
| Paraffin wax | 30 parts |

EXAMPLE A2

A thermal transfer sheet of the present invention was prepared in the same manner as in Example A1, except that the following composition for a surface layer was coated by means of a bar coater at a coverage of 1.0 g/m$^2$ on a solid basis on the hot-melt ink layer in Example A1 and the resultant coating was dried at 65° C. to form an adhesive layer.

Composition For Surface Layer

| | |
|---|---|
| Carnauba wax emulsion (average particle diameter: 0.5 μm) | 40 parts |
| IPA/water (3:1) | 50 parts |

Comparative Example A1

A comparative thermal transfer sheet was prepared in the same manner as in Example A1, except that the following composition for a hot-melt ink layer was used instead of the composition used in Example A1.

Composition For Hot-Melt Ink Layer

| | |
|---|---|
| Pigment | 10 parts |
| Aluminum paste (diameter: 5 μm, thickness: 0.05 μm) | 25 parts |
| EVA | 10 parts |
| Carnauba wax | 7 parts |
| Candelilla wax | 14 parts |
| Paraffin wax | 30 parts |

Comparative Example A2

A comparative thermal transfer sheet was prepared in the same manner as in Example A1, except that the following composition for a hot-melt ink layer was used instead of the composition used in Example A1.

Composition For Hot-Melt Ink Layer

| | |
|---|---|
| Pigment | 10 parts |
| Aluminum paste (diameter: 22 um, thickness: 0.7 μm) | 25 parts |
| EVA | 10 parts |
| Carnauba wax | 7 parts |
| Candelilla wax | 14 parts |
| Paraffin wax | 30 parts |

Comparative Example A3

A comparative thermal transfer sheet was prepared in the same manner as in Example A1, except that the following composition for a hot-melt ink layer was used instead of the composition used in Example A1.

Composition For Hot-Melt Ink Layer

| | |
|---|---|
| Pigment | 10 parts |
| Copper powder (average particle diameter: 15 μm) | 25 parts |
| EVA | 10 parts |
| Carnauba wax | 7 parts |
| Candelilla wax | 14 parts |
| Paraffin wax | 30 parts |

Comparative Example A4

The following composition for a release layer and the following composition for an anchor layer for vapor deposition were coated by means of a bar coater respectively at coverages of 1.0 g/m$^2$ and 0.2 g/m$^2$ on a solid basis on a 6.0 μm-thick polyester film (Lumirror, manufactured by Toray Industries, Inc.) with a heat-resistant slip layer formed on the back surface thereof, and the resultant coatings were dried at 80° C. to form a release layer and an anchor layer for vapor deposition. Thereafter, a 600 Å-thick vapor-deposited aluminum layer was formed by vacuum deposition. The following composition for an adhesive layer was then coated by means of a bar coater at a coverage of 2.0 g/m$^2$ on a solid basis on the deposited metal layer, and the coating was dried at 80° C. to form an adhesive layer, thereby preparing a comparative thermal transfer sheet.

Composition For Release Layer

| | |
|---|---|
| Carnauba wax | 95 parts |
| Styrene-butadiene rubber | 5 parts |

Composition For Anchor Layer For Vapor Deposition

| | |
|---|---|
| Chlorinated polypropylene | 10 parts |
| MEK/toluene | 90 parts |

Composition For Adhesive Layer

| | |
|---|---|
| EVA particle emulsion (particle diameter: 7 μm, minimum film forming temp.: 70° C.) | 10 parts |
| Carnauba wax emulsion | 40 parts |
| IPA/water (3:1) | 50 parts |

For the thermal transfer sheets thus obtained, the luster of prints, printing sensitivity, and storage stability were evaluated.

Printing Conditions

Printer: printing tester manufactured by DAI NIPPON PRINTING CO., LTD.

Printing speed: 2 in./sec

Printing paper: paper having a Bekk smoothness of 200 sec

The results are given in Table 1.

TABLE 1

| | Luster | Sensitivity | Storage stability |
|---|---|---|---|
| Ex. A1 | O | O | O |
| Ex. A2 | O | O | ◎ |
| Comp. Ex. A1 | Δ | O | O |
| Comp. Ex. A2 | O | Δ | O |
| Comp. Ex. A3 | Δ | Δ | O |
| Comp. Ex. A4 | ◎ | X | O |

In Table 1, the luster, the sensitivity, and the storage stability were evaluated by the following respective methods.

Evaluation of Luster

Solid printing was carried out, and the luster of the resulting prints were evaluated by visual inspection.

◎: High luster and near specular surface

○: High luster

Δ: Low luster

Evaluation of Sensitivity

For prints, the transferability of the ink was evaluated by visual inspection using a test pattern manufactured by . . .

○: Good ink transferability

Δ: Poor ink transferability at the time of initiation of printing

X: Low sensitivity and severe blurring of the image as a whole

Storage Stability

The thermal transfer sheet was stored in a rolled state under an environment of temperature 55° C. and humidity 85% for 24 hr, and the state of the print was evaluated by visual inspection.

○: Luster and sensitivity on levels equal to those before storage

603 : Somewhat lowered sensitivity but still on a satisfactory level for practical use The thermal transfer sheets of the present invention eliminate the need to use any equipment, such as vapor deposition apparatus, and to provide an anchor layer for vapor deposition and can provide a print having high brightness and good metallic luster even on paper having low smoothness.

EXAMPLE B1

The following coating liquid for a hot-melt ink layer was coated by means of a bar coater on a 4.5 μm-thick polyester film (Lumirror, manufactured by Toray Industries, Inc.) with a heat-resistant slip layer formed on the back surface thereof, and the resultant coating was dried at 80° C. to form a hot-melt ink layer. A coating liquid for a surface layer was coated thereon by means of a bar coater at a coverage of 0.5 g/m$^2$ on a solid basis, and the resultant coating was dried at 80° C. to form a surface layer. Thus, thermal transfer sheets 1 to 3 of the present invention were prepared.

Thermal transfer sheet 1 of invention:

Coating Liquid For Hot-Melt Ink Layer

| | |
|---|---|
| Magenta pigment | 10 parts |
| EVA | 10 parts |
| Carnauba wax | 7 parts |
| Candelilla wax | 14 parts |
| Paraffin wax | 30 parts |
| Xylene | 80 parts |

Coating Liquid For Surface Layer

| | |
|---|---|
| Carnauba wax emulsion (particle diameter: 0.3 um) | 40 parts |
| IPA/water (3:1) | 60 parts |
| Thermal transfer sheet 2 of invention: | |

Coating Liquid For Hot-Melt Ink Layer

| | |
|---|---|
| Yellow pigment | 10 parts |
| EVA | 10 parts |
| Carnauba wax | 7 parts |
| Candelilla wax | 14 parts |
| Paraffin wax | 30 parts |
| Xylene | 80 parts |

Coating Liquid For Surface Layer

| | |
|---|---|
| Carnauba was emulsion (particle diameter: 0.3 μm) | 40 parts |
| IPA/water (3:1) | 60 parts |
| Thermal transfer sheet 3 of invention: | |

Coating Liquid For Hot-Melt Ink Layer

| | |
|---|---|
| Cyan pigment | 10 parts |
| EVA | 10 parts |
| Carnauba wax | 7 parts |
| Candelilla wax | 14 parts |
| Paraffin wax | 30 parts |
| Xylene | 80 parts |

Coating Liquid For Surface Layer

| | |
|---|---|
| Carnauba wax emulsion (particle diameter: 0.3 μm) | 40 parts |
| IPA/water (3:1) | 60 parts |

EXAMPLE B2

Thermal transfer sheets of the present invention were prepared in the same manner as in Example B1, except that the following coating liquid for a surface layer was used instead of the coating liquid for a surface layer used in Example B1.

Coating Liquid For Surface Layer

| | |
|---|---|
| Melamine particles (particle diameter: 0.5 μm) | 5 parts |
| Carnauba wax emulsion (particle diameter: 0.3 μm) | 40 parts |
| IPA/water (3:1) | 60 parts |

Comparative Example B1

Comparative thermal transfer sheets (three thermal transfer sheets respectively having yellow, magenta, and cyan ink layers as in Example B1) were prepared in the same manner as in Example B1, except that the following coating liquid for a surface layer was used instead of the coating liquid for a surface layer used in Example B1.

Coating Liquid For Surface Layer

| | |
|---|---|
| Carnauba wax emulsion (particle diameter: 0.05 μm) | 40 parts |
| IPA/water (3:1) | 60 parts |

Comparative Example B2

Comparative thermal transfer sheets (three thermal transfer sheets respectively having yellow, magenta, and cyan ink layers as in Example B1) were prepared in the same manner as in Example B1, except that the following coating liquid for a surface layer was used instead of the coating liquid for a surface layer used in Example B1.

Coating Liquid For Surface Layer

| | |
|---|---|
| Carnauba wax emulsion (particle diameter: 6 μm) | 40 parts |
| IPA/water (3:1) | 60 parts |

Comparative Example B3

A comparative thermal transfer sheet was prepared in the same manner as in Example A1, except that no coating liquid for a surface layer was used.

For the thermal transfer sheets thus obtained, the sensitivity in printing and suitability for overprinting were evaluated.

Printing Conditions

Printer: printing tester manufactured by . . .
Printing speed: 2 in./sec
Printing paper: paper having a Bekk smoothness of 200 sec The results are given in Table 2.

TABLE 2

| | Sensitivity | Suitability for overprinting |
|---|---|---|
| Ex. B1 | O | O |
| Ex. B2 | O | O |
| Comp. Ex. B1 | O | Δ |
| Comp. Ex. B2 | O | Δ |
| Comp. Ex. B3 | O | Δ |

The sensitivity and the suitability for overprinting were evaluated by the following respective methods.

Evaluation of Sensitivity

For prints, the transferability of the ink was evaluated by visual inspection using a test pattern manufactured by . . .

O: Good ink transferability

Evaluation of Suitability For Overprinting

Overprinting was performed using the thermal transfer sheets respectively for yellow, magenta, and cyan, and the quality of resultant print was evaluated by visual inspection.

O: Sharp color free from color-to-color intermixing in overprinted area

Δ: Color-to-color intermixing in overprinted area resulting in unsharp color and somewhat uneven density According to the thermal transfer sheets of the present invention, lamination of individual colors can be successfully carried out in a process color printing where at least two colors are overprinted, offering a sharp color image free from color-to-color intermixing.

What is claimed is:

1. A thermal transfer sheet comprising:

a substrate sheet;

a hot-melt ink layer provided on at least one surface of the substrate sheet, the hot-melt ink layer containing a metallic powder having such a particle geometry that the shape is tabular, the diameter is from 8 to 20 μm, and the thickness is from 0.01 to 5 μm; and a surface layer provided on the hot-melt ink layer, the surface layer being formed of a dried product of a wax emulsion containing wax particles having an average diameter of from 0.1 to 5 μm and having a melting point of from 60° to 90° C.

* * * * *